United States Patent [19]

Rauhut

[11] 3,836,837
[45] Sept. 17, 1974

[54] PHASE CONVERTER

[75] Inventor: Paul Rauhut, Ennetbaden, Switzerland

[73] Assignee: Brown Boveri & Company Ltd., Baden, Switzerland

[22] Filed: May 10, 1973

[21] Appl. No.: 358,977

[30] Foreign Application Priority Data
May 12, 1972 Switzerland.................... 6926/72

[52] U.S. Cl.................................. 321/55, 323/116
[51] Int. Cl............................ H02m 5/32, G05f 3/00
[58] Field of Search.......... 321/52, 55, 50; 318/179, 318/229, 230; 323/103, 104, 107, 111, 116, 117, 118; 322/20

[56] References Cited
UNITED STATES PATENTS

| | | | |
|---|---|---|---|
| 608,308 | 8/1898 | Steinmetz | 321/55 |
| 1,583,622 | 5/1926 | Steinmetz | 321/50 |
| 1,894,084 | 1/1933 | Chase | 321/55 |
| 2,044,798 | 6/1936 | Landis | 321/55 |
| 2,754,464 | 7/1956 | Wizener et al. | 318/229 |

*Primary Examiner*—William H. Beha, Jr.
*Attorney, Agent, or Firm*—Toren, McGeady and Stanger

[57] ABSTRACT

In the phase converter disclosed, a rotating machine has a stator winding connected at suitable terminals to a multiphase system with a plurality of lines and a single-phase system composed of one of the multiphase lines and a single-phase line. In the machine, a rotor in the form of a squirrel cage winding coacts with the stator voltages to produce unsymmetrical electromotive forces in the multiphase systems. An auxiliary voltage source having a continuously variable magnitude and phase, and connected between the line common to both systems and one of the terminals of the stator, compensates for the unsymmetrical electromotive forces.

41 Claims, 9 Drawing Figures

PHASE CONVERTER

BACKGROUND OF THE INVENTION

This invention relates to phase converters used between multiphase and single-phase systems, and particularly to phase converters having a stator coupling the multiphase system to the single-phase system and having a rotor with a squirrel cage winding.

Single-phase asynchronous motors are built only for low power applications. They require auxiliary windings for starting. Saddle moments make starting more difficult. Inverse rotating fields produce additional losses.

In order to avoid these difficulties, single-phase-multiphase converters energize standard multiphase motors from a single-phase system. Such converters are similar to a multiphase asynchronous squirrel cage machine. Their stator windings are fed single-phase energy. An elliptic rotating field is formed during the run. This field generates a multiphase voltage in the multiphase winding of the stator to which the motors are connected. The squirrel cage winding also serves to compensate for the inverse component of the single-phase current. Such a circuit was first suggested by Arno. See the publication by Bodefeld Th. und Sequenz H. entitled Elektrische Maschinen, published by Springer-Verlag 1965, p.297; and the publication by Sachs K. entitled Elektrische Triebfahrzeuge Vol. 2, published by Frauenfeld 1953, p. 372–384.

Kando and Hellmund developed a converter for use in locomotives which were energized with single-phase currents of 50 and 60 cycles and which energize multiphase asynchronous motors. These locomotives are no longer built today. However, in agricultural regions with single-phase current supplies, phase converters still feed motors of several horsepower.

Heretofore, converters were used to convert single-phase current into rotary current. They were built for moderate power. They exhibit great asymmetry of voltages and currents on the multiphase end. Thus, the operation of three-phase motors presents difficulties. It has been possible to achieve satisfactory symmetry by unsymmetrically tapping the three-phase voltage at taps of autotransformers, connection of chokes in certain phases, coupling phase strands over compounding transformers, and similar means. However, the symmetry was achieved only for loads having particular active and reactive components. Outside of such loads the symmetry was unavailable. Also, it was left to the locomotive engineer to adjust the system manually by switching winding taps. The compounding transformers require considerable reactive power, which results in a corresponding voltage drop. Their adjustment is cumbersome and must be adapted to the motors. Their use is limited.

In locomotives, the single-phase winding and the three-phase winding were deliberately arranged in the converter so that their fluxes linked with each other poorly. Wide and long stray paths were even arranged between the two windings. This way the flux produced an electrically "soft" machine in this single-phase multiphase system. This produced less susceptibility to unsymmetry. However, the secondary voltage showed a greater drop and was readjusted by an excitor winding arranged in the rotor. Converters of the above-described type can only satisfy moderate demands.

An object of the invention is to improve phase converters.

Another object of the invention is to provide a phase converter which satisfies higher standards and is suitable for high powers, such as of the type required for coupling a single-phase railroad network with a three-phase network of equal frequency in an overall or national supply system, wherein the symmetry is adjusted automatically and continuously and the real and reactive power is regulated randomly in magnitude and direction at the coupling position.

Today, in many parts of the world, there is a tendency to obtain railroad operating current directly from a regional or national supply network. For this purpose, the overhead line is divided into insulated sections which are connected alternately to different phases for introducing compensation. The following difficulties are caused by the single-phase load. The real and reactive power of the sections fluctuate relative to each other. The real power fluctuates about a mean value $P = VI \cos \phi$, with double the mains or network frequency, by an amount $VI = P/\cos \phi$, which exceeds P by the ratio $1/\cos \phi$. The asymmetry of the load causes the three-phase network to experience an oblique or skew or highly reactive load (Schieflast) within inverse current. These types of loads can be intolerable even for powerful networks.

An object of the invention is to provide a converter which keeps the three-phase mains free of such disturbances. This is, therefore, of particular importance for the current supply of railroad networks.

Another object of the invention is to obviate the aforementioned disadvantages and to solve the accompanying problems.

SUMMARY OF THE INVENTION

According to a feature of the invention, these objects are attained, in whole or in part, by arranging at least one in-phase opposing voltage of a low-leakage voltage source between the multiphase terminal and the corresponding network or main, which voltage source has a phase and magnitude that can be varied continuously (without steps) so as to compensate for the unsymmetrical voltage drop, at least to the main axis, produced by the single-phase current in the phase converter.

These and other objects of the invention are pointed out in the claims. Other objects and advantages of the invention will become evident from the following detailed description when read in light of the accompanying drawings.

DESCRIPTION OF PREFERRED EMBODIMENTS

Figure 1:
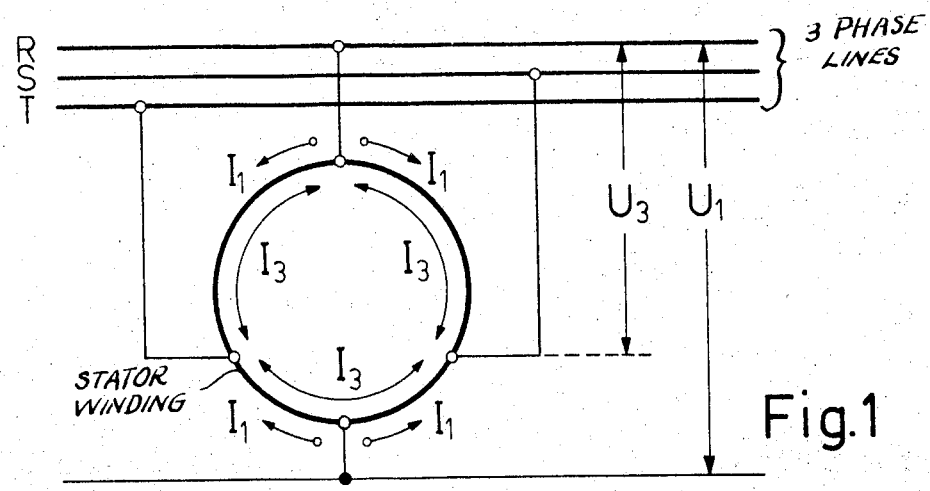
FIG. 1 is a simplified schematic diagram of a multiphase-single-phase converter.

In FIG. 1, a phase converter, illustrated in simplified form and connected as shown, couples a three-phase system with a single-phase system. For simplicity, the magnetizing currents and the voltage drops are at first disregarded. Corresponding to the three-phase voltage $V_3$ between three lines R, S. and T, there exists in the converter a synchronously rotating field corresponding to the voltage $V_1$ pulsating at the single-phase terminal. The phase converter includes three winding sections with three phase currents $I_3$ and two winding sections with a single-phase current $I_1$. Thus:

$$3V_3I_3 = 2V_1I_1$$

Thus:

$$I_1 = 1.3I_3$$

The current $I_3$ corresponds to a sinusoidal synchronously rotating flow having a maximum value $$\theta = 2/\pi \; \omega I_3 = .6366 I_3$$

The single-phase current $I_1$ corresponds to a triangular, nonrotational flow with a local maximum value $\theta = \omega I_1$ which can be divided into a synchronously following rotational flow $\theta_{1m}$ and an oppositely rotating rotational flow $\theta_{1g}$. Thus, we have $$\theta_{1m} = \theta_{1g} = \tfrac{1}{2}\theta_1 = \omega/2 \; I_1 = 0.65\omega I_3$$

The flow $\theta_{1m}$ cancels $\theta_3$. Small difference in the coefficient is due to the fact that no substitution was made for the fundamental frequency of the triangle curve $\theta_1$.

The squirrel cage winding has the effect of causing only a sinusoidal rotary field to rotate in the air gap with a velocity corresponding to the system or mains frequency and the number of poles. The squirrel cage winding also forces the following rotational flow $\theta_1$ to be sinusoidal, that is the 3-phase currents must be symmetrical. The inverse rotary flow rotates in the opposite direction. It can thus not build up a field and is compensated for by an oppositely flowing flow in the rotor. Consequently, no inverse currents flow in the stator winding.

The frequency of the rotor current is equal to double the system or mains frequency (if the rotor is energized by DC current), and double the system frequency-slip frequency (when the rotor does not have such excitation). In view of this fact, and according to an embodiment of the invention, the damping winding is provided with Roebel rods. The operation of the damping winding improves the more closely it is coupled with the stator winding. According to an embodiment of the invention, the corresponding leakage is kept low.

This also applies to the stator winding as such. The lowest possible leakage between the three-phase system and the single-phase system, preferably galvanic leakage of the latter, is produced. The reason for this follows. For simplicity, we assume a galvanic leakage. Here, three-phase and single-phase currents are superposed. The former produces symmetrical voltage drops in the three lines. The latter flows through the winding diametrically, hence unsymmetrically with regard to the three phases. Accordingly, it must produce an unsymmetrical voltage drop there. However, the latter should be small to produce as little interference as possible. The leakage must therefore be kept low. The remaining unsymmetrical voltage drops result in asymmetry of the terminal voltage. In order to be able to switch the latter onto the symmetrical network or mains voltage, the aforementioned auxiliary source is interposed.

Figure 2:
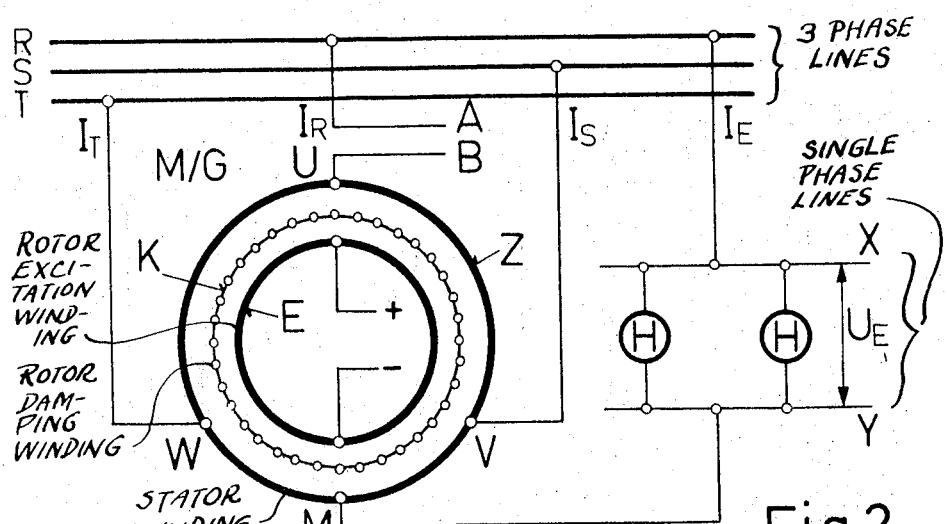
FIG. 2 is a simplified representation of a phase converter embodying features of the invention.

FIG. 2 is a diagram illustrating an embodiment with galvanically linked systems or networks. The converter M/G includes a stator with a winding Z having terminals U,V,W, and M. The converter also includes a rotor with the damping winding K, and in this embodiment the excitation winding E, which can be energized through slip rings or by means without brushes. The terminals U, V, and W are connected to the three-phase mains or lines R, S, and T. The auxiliary voltage source is arranged between the terminals R and U at points A and B. Two single-phase mains or lines X and Y are connected between the main R and the terminal M. Machines H are connected to mains X and Y.

Figure 3:
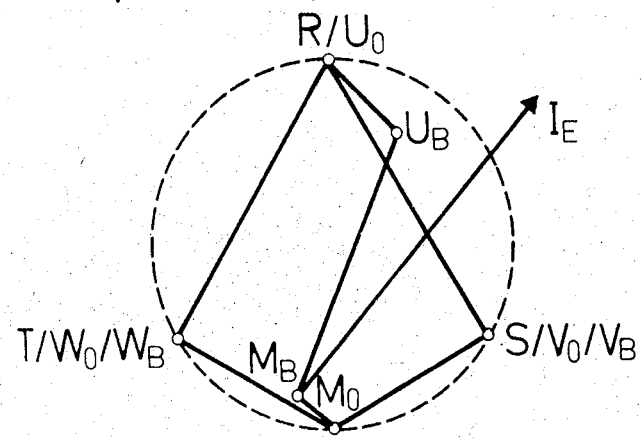
FIG. 3 is a vector diagram for explaining the operation of the phase converter of FIG. 2.

FIG. 3 illustrates a vector diagram of the voltages appearing in the embodiment of FIG. 2. During idling motions (indicated by the subscript o) the three voltages RS, ST, and TR at the mains R, S, and T are identical to the terminal voltages $U_oV_o$, $V_oW_o$, and $W_oU_o$. The single-phase voltage XY across the mains X and Y is identical with the terminal voltage $U_oM_o$. When loaded, a voltage drop is produced. On the three-phase side it is symmetrical and small. For simplicity, this voltage drop will be neglected. The potentials of the terminals being loaded are indicated by the subscript B. For the terminals V and W they can be assumed as fixed: $V_B$ drops to S, $W_B$ to T. However, the single-phase current $I_E$ produces voltage drops between these fixed points and the terminals U and M. The potential of the terminal U is displaced toward $U_B$, and the potential of terminal M toward $M_B$. The amounts of these displacements correspond approximately to the leakage reactances. If X is the single-phase leakage reactance between the terminals U and M, the following equations apply approximately:

$$U_{oB} = 2/3 \cdot I_E$$

for the voltage drop between $U_o$ and $U_B$, and $$M_{oB} = 1/3 \cdot I_E$$

for the voltage drop between $M_o$ and $M_B$.

As mentioned, an auxiliary voltage is introduced between the points A and B. This voltage is regulated to a value $U_{oB}$ which depends in size, direction, and phase on $I_E$. As a result, satisfactory operation of the machine is possible with any type of load (real or reactive of any size and direction).

The manner in which regulation is effectd is described later. A simple method is described with respect to FIG. 3. Here, $M_oM_B$ is half the size of $U_oU_B$ in the same direction. The no-load potential $M_o$ of the terminal M can be held in its position with regard to the potential of mains R, S, and T by a simple device. The voltage difference of this fixed point relative to $M_o$ is tapped. It is then introduced into the control circuit in which an auxiliary voltage of twice the magnitude is formed for introduction at the points A and B.

We first consider the case of the lead current $I_E$ having a constant phase shift relative to the voltage $V_E$ of the mains, and that the current $I_E$ can vary in magnitude and possibly also in direction (that is, in sign). A single regulatable auxiliary voltage of constant phase shift with regard to the voltage of the mains is sufficient for this purpose. However, if the phase shift of $I_E$ is variable with respect to $V_E$, it is preferable to use two series-connected auxiliary voltages displaced by 90°. Suitable adjustment of the two components makes a summation voltage of any size and phase available. Embodiments of the aforementioned type appear in FIGS. 4 and 6.

Figure 4:
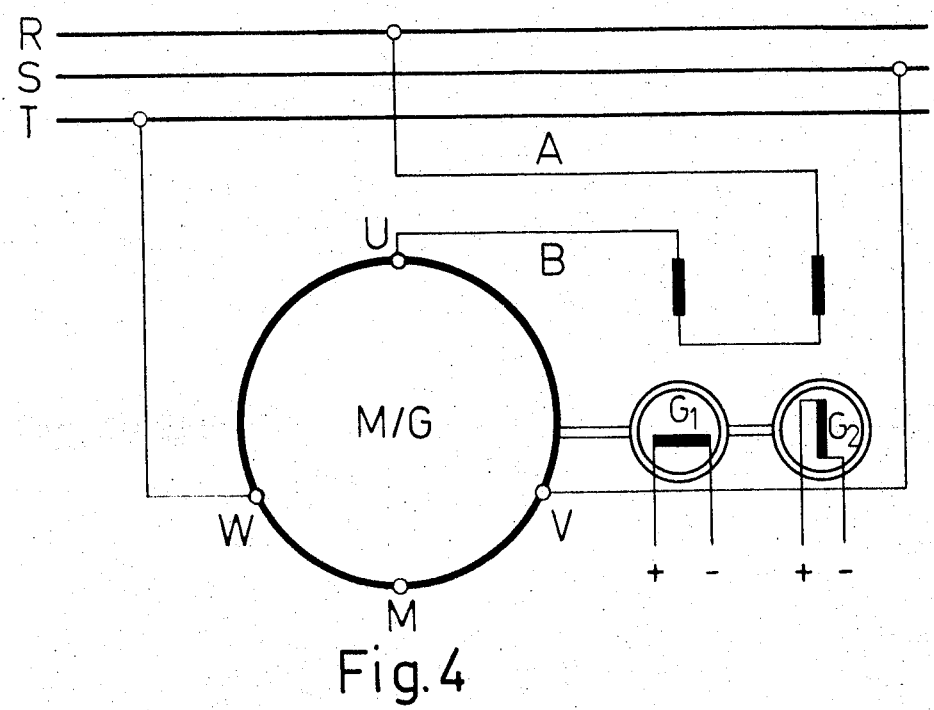
FIG. 4 is another schematic diagram illustrating a phase converter having a direct current control winding and two synchronous machines, and embodying features of the invention.

In the diagram of FIG. 4, the converter is designated M/G. Its rotor has a DC excitor winding. Consequently, it runs in synchronism with both mains. Mechanically coupled with the rotor are the single-phase synchronous machines $G_1$ and $G_2$. The voltages of these machines are 90° out of phase with each other. According to an embodiment of the invention, the two synchronous machines are set so that one is regulated by the real current and the other by the reactive current of one of the two systems. The sum of their voltages compensates for the voltage difference between the terminal U and the busbar R of the mains.

Figure 4A:
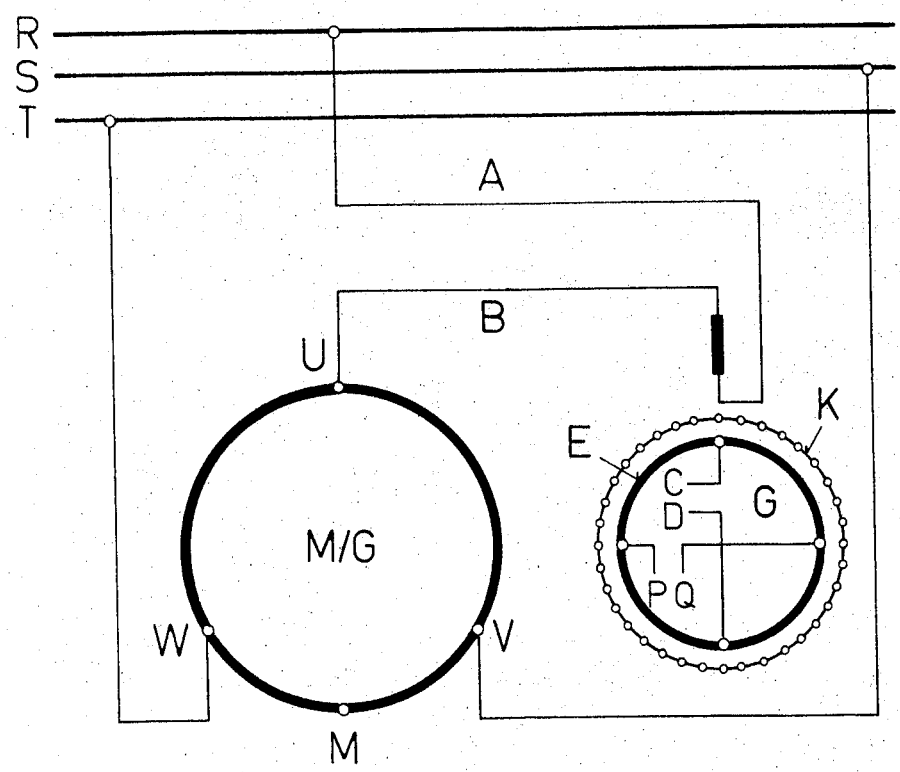
FIG. 4a is diagram of a phase converter with one of several synchronous machines, and embodying features of the invention.

The two synchronous machines can also be driven separately by a synchronous motor which is fed from one of the two systems, for example, the three-phase system. According to an embodiment of the invention, the synchronous machines are excited through stationary thyristors or by brushless means through directly coupled AC excitor machines whose delivery currents are rectified with rotating diodes. According to another embodiment of the invention, the two synchronous machines $G_1$ and $G_2$ are replaced by a single machine G as in FIG. 4a. Here, the distributed excitor winding E is applied to two perpendicularly arranged opposing sets of points C and D, and P and Q respectively, so that the resulting exciting current can be adjusted at random over all four quadrants. The winding K serves as a damping winding.

Figure 5:
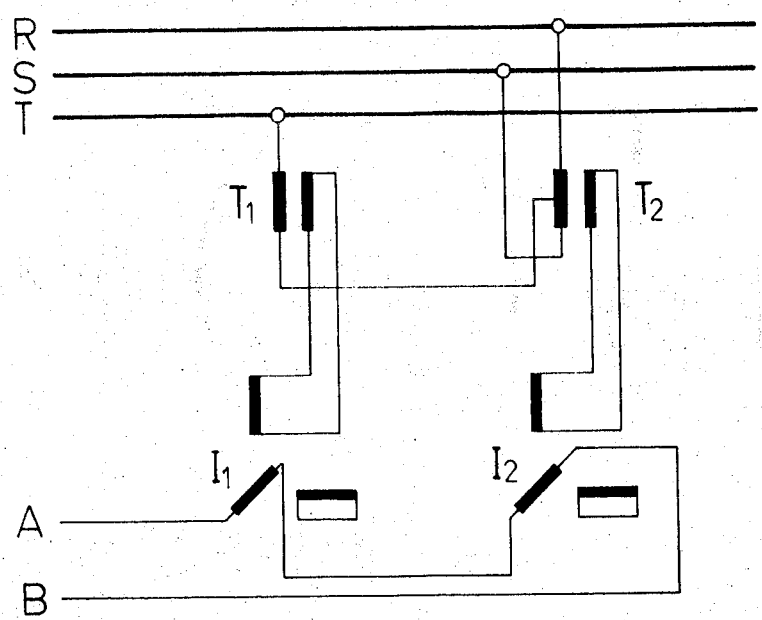
FIG. 5 is a schematic diagram of a control apparatus.

The diagram of FIG. 5 shows two induction regulators $I_1$ and $I_2$. These are energized by transformers $T_1$ and $T_2$ which are arranged to operate in a Scott connection and which supplies two voltages 90° out of phase to A and B of FIG. 2.

Figure 6:
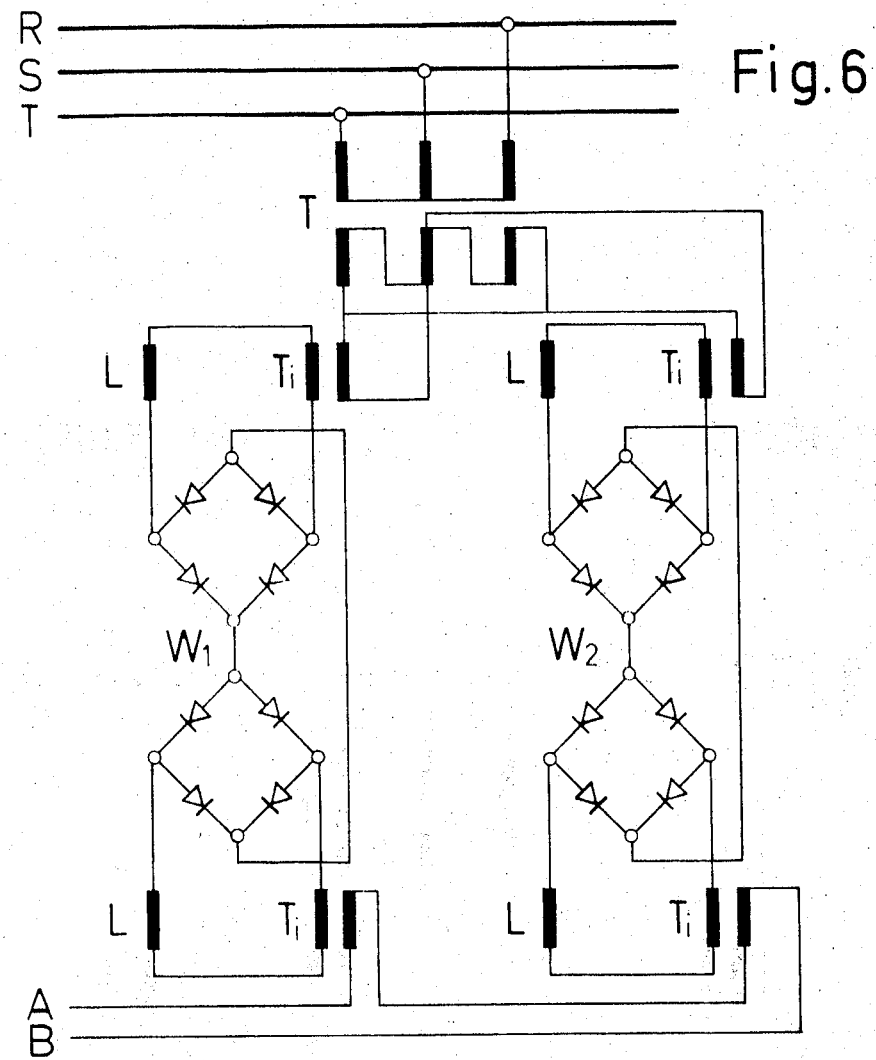
FIG. 6 is a schematic diagram of still another example of a control apparatus.

FIG. 6 illustrates a static arrangement. The transformer T is a so-called Kubler circuit described by Bodefeld und Sequenz in Elektrische Maschinen, Springer 1965, S. 117, supplies two voltages 90° out of phase with each other to the regulated AC converters with intermediate DC circuits $W_1$ and $W_2$. The latter supply the two auxiliary voltages to the points A and B. Reference characters $T_i$ and L respectively denote isolating transformers and chokes. The converters draw single-phase power from the multiphase mains. However, they free it of oblique loads or large phase angle loads (Schieflast) to a much greater extent.

According to an embodiment of the invention, the auxiliary voltage is connected to the strand, of the three-phase feed line to the converter RU, which leads the three-phase mains to the phase coupled with the single-phase mains X and Y. This feed line carries the differential in the current $I_R$ in the three-phase system or network and the single-phase current $I_E$. As a result, the power of the auxiliary voltage source is kept low and the voltage drops are small. If the single-phase mains were connected to the transformer terminals, another possibility, the aforementioned advantages would be lost. The auxiliary voltage source would carry the full phase current $I_R$ and great voltage drops would be formed between the two systems.

If the two mains are to be linked galvanically in the stator winding, the leakage between the multiphase and single-phase winding must be kept as low as possible. This is accomplished by applying the aforementioned measures to mains which are not galvanically linked to each other.

It is advisable to measure the following and inverse components of the multiphase currents. The inverse components can be introduced into the control circuits and the auxiliary voltage can be controlled so that the inverse component becomes very small.

If the converter is regulated so that the multiphase currents are symmetrical, that is, so that the currents are equal and have the same phase difference between each other, no oblique load is produced in the multiphase system by the converter. Single-phase current then flows exclusively through the converter, rather than partially through the multiphase system. This comparative viewpoint confirms the fact that the effect of the currents of both systems or networks upon the converter, with respect to the voltage drops, the current distribution on the individual winding segments etc., can be simply explained by superposition of the currents.

The invention further improves the phase converter by regulating the real and reactive powers. If the mains of a three-phase and a single-phase system are tightly coupled with each other at more than one point, either by static means such as transformers or static frequency changers, or by rotating converters in accordance with the invention, the power flow must be regulated by some means.

When the systems are tightly coupled, the fact that the number of phases is not equal is comparatively unimportant. Effectively, the coupling changes the two systems into a single compound system. The magnitude and direction of the power flow at the coupling points can be regulated substantially by the following voltages: the real power by the transverse voltages related to the system voltage vector at the mains; the reactive power by longitudinal voltages. Such adjustable auxiliary voltages are also of advantage for starting a converter and for switching the mains together during synchronization.

Figure 8:
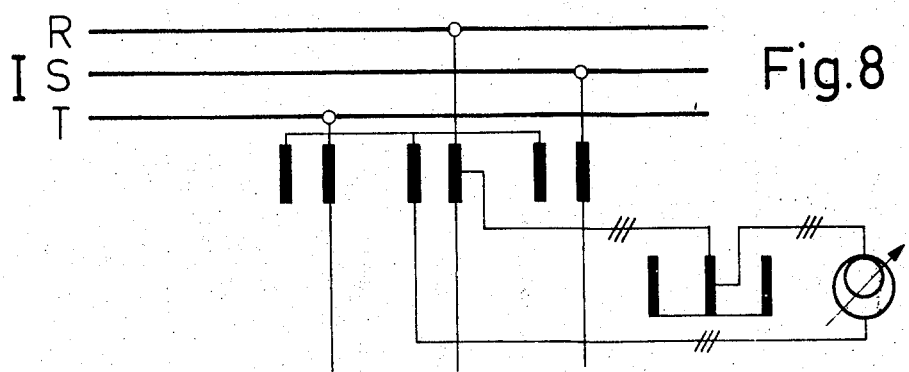
FIG. 8 is a circuit diagram showing an embodiment of a simple induction regulator.
Figure 7:
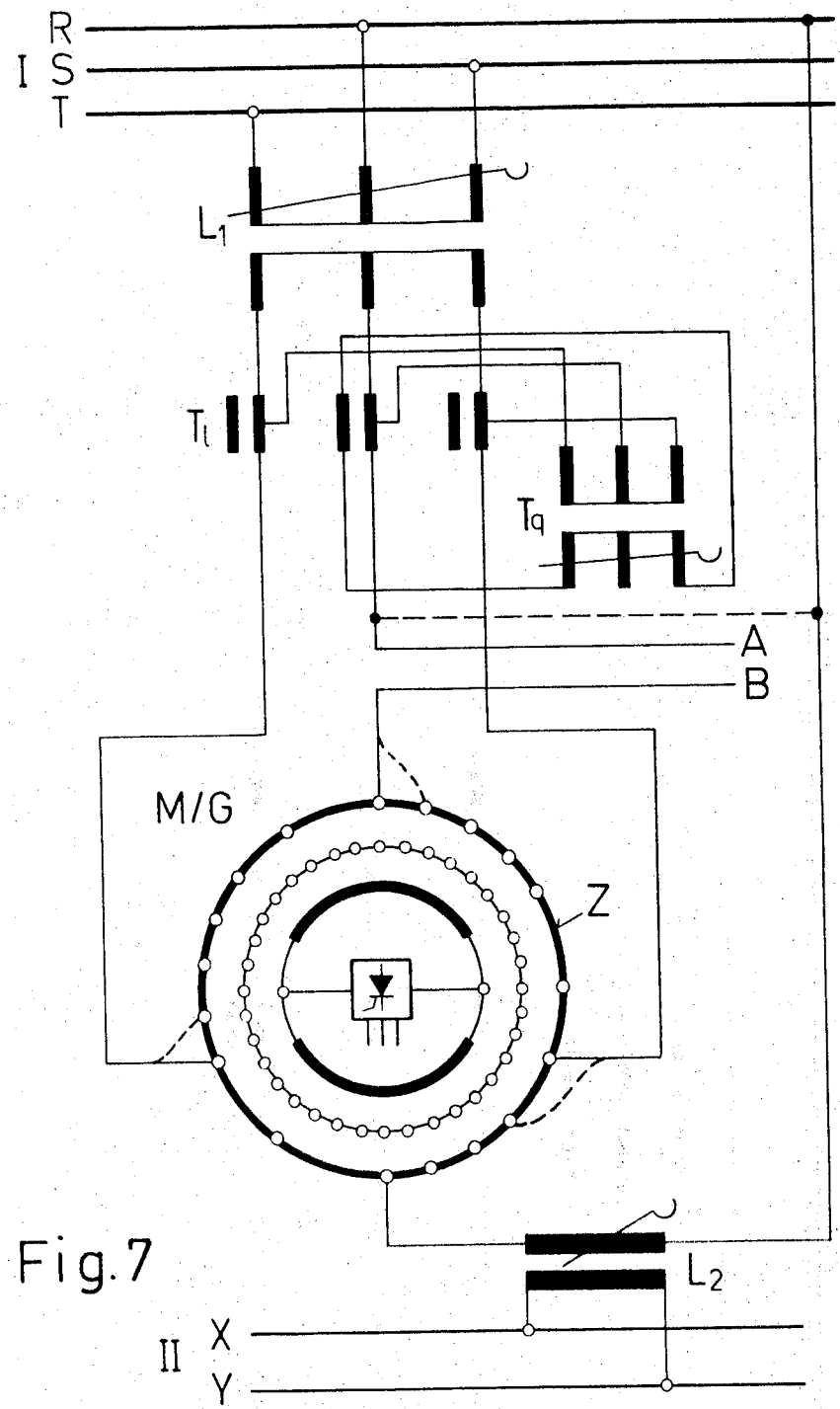
FIG. 7 is a schematic diagram showing an embodiment of an arrangement for the generation of auxiliary voltages.

FIG. 7 shows an embodiment of the invention for auxiliary voltages which effect a voltage rotation as a result of the transverse voltage. Here, transformers $T_1$ and $T_q$ supply a transverse component. The magnitude of the latter is adjusted by the transformer $T_q$ and can also be adjusted with respect to direction (sign) by using a duplex star connection instead of a simple star. The transverse voltage is connected into the line by transformer $T_1$. The stator winding Z of the phase converter M/G is provided with taps. By switching to different taps, the voltages can be rotated or twisted. The voltage can also be rotated or twisted by induction regulators. These can be simple induction regulators as represented in the embodiment of FIG. 8, or the perfect system shown in Swiss pat. No. 499,222.

According to an embodiment of the invention, a transverse voltage is introduced by use of a synchronous machine which is mechanically coupled to a synchronous rotating converter. According to another embodiment of the invention, the synchronous machine is positioned separately and driven by a synchronous motor. Exciting the synchronous machine along one axis establishes the direction of the transverse voltage. Exciting the machine along two axes or in a similar manner permits the direction of the transverse voltage to be set as desired or required.

According to an embodiment of the invention, static arrangements are used for producing the auxiliary voltages.

Variation of the ratio of the terminal voltages of the converter relative to each other permits the converter to regulate the reactive power flow. An auxiliary voltage is formed by a voltage which is substantially in phase or in phase opposition with the voltage of the mains. According to an embodiment of the invention, this purpose is achieved by longitudinal transformers, for example, the type according to FIG. 7: A transformer $L_1$ is used on the three-phase side, a transformer $L_2$ on the single-phase side,--simple or duplex induction regulators (see above)--, or a multiphase synchronous machine. (The aforementioned can perform the function of regulating the real and reactive power jointly multiaxial excitation) It is also possible to use static arrangements, such as those combined with real power regulation.

By virtue of the invention, it is possible to build phase converters for very high powers such as 50,000 kVA and more. Normally, to achieve such powers it would be necessary to use machine sets composed of two synchronous machines, each operating at full power. However, in the multiphase converter with galvanic linkage, (apart from losses in the small auxiliary source), losses exist only in one machine and in one machine part, namely iron losses
winding losses (in the stator only and corresponding to the current formed by superposition)
addition losses
excitation losses
friction losses, The efficiency of the converter is thus very high.

With the low leakage apparatus having galvanic linkages, the voltage drop across the converter is small. This is another advantage.

It has been pointed out above that the rotary flow of the multiphase system $H_3$ and the synchronously following rotary flow of the single-phase system $H_{1m}$ compensate for each other. Not all winding arrangements are capable of effecting such compensation. The electrical data, like step reductions, zone widths, number of slots, (integer slot winding or fractional slot winding), number of windings, etc, must be suitably selected. According to the invention, the winding is arranged for complete compensation of the aforementioned rotary flows.

According to an embodiment of the invention, the term "galvanically coupled" is used in the sense of "conductively coupled." The terms "following components" and "inverse components" refer to in-phase and out of phase or reactive components.

The term "oblique load" or "Schieflast" refers to reactive loads or loads that rotate a voltage rector.

While specific embodiments of the invention have been shown and described in detail to illustrate the application of the inventive principles, it will be understood that the invention may be embodied otherwise without departing from such principles.

What is claimed is:

1. A phase converter for coupling a multiphase system having a plurality of lines with a single-phase system, comprising stator means for closely coupling the systems with each other, said stator means having a plurality of terminals coupled to the lines, rotor means having a squirrel cage winding, and single-phase auxiliary voltage source means connected between one of said multiphase terminals and one of said lines, said voltage source means being continuously variable in magnitude and phase between conditions which produce unsymmetrical voltages at the multiphase terminals and at least one magnitude and phase which produces a symmetrical voltage drop at the terminals.

2. A converter as in claim 1, wherein said voltage source means exhibits a low leakage.

3. A converter as in claim 1, wherein the symmetry is measured relative to a main axis.

4. A converter as in claim 1, wherein coupling of the single-phase system to the stator means, and the rotor means and the stator means together, are capable of producing an unsymmetrical voltage drop in the multiphase system in the absence of said auxiliary voltage source means.

5. A phase converter as in claim 1, wherein said rotor means includes an exciter winding.

6. A converter as in claim 1, wherein said voltage source means includes a single-phase synchronous machine driven in synchronism with the three-phase lines.

7. A converter as in claim 5, wherein said voltage source means includes a single-phase synchronous machine driven in synchronism with the three-phase lines.

8. A converter as in claim 7, wherein the synchronous machine is excited with two currents 90° displaced from each other.

9. A phase converter as in claim 7, wherein said stator means includes a DC exciter winding, and said synchronous machine is driven by said rotor.

10. A converter as in claim 1, wherein said voltage source means includes at least one single-phase induction regulator.

11. A converter as in claim 5, wherein said voltage source means includes at least one single-phase induction regulator.

12. A converter as in claim 1, wherein said voltage source means includes an AC converter.

13. A phase converter as in claim 12, wherein said voltage source means includes an intermediate circuit converter.

14. A converter as in claim 5, wherein said voltage source means includes an AC converter.

15. A converter as in claim 5, wherein said voltage source means includes an intermediate circuit converter.

16. A converter as in claim 1, wherein said voltage source means precludes two regulatable components.

17. A converter as in claim 16, wherein said components are perpendicular to each other.

18. A converter as in claim 16, wherein the components are regulated so that the resulting auxiliary voltage is in phase with the unsymmetrical voltage drop, and of equal size and opposite direction.

19. A converter as in claim 17, wherein the two components are controlled by the real and reactive current components of one of said systems.

20. A converter as in claim 19, wherein the real and reactive current components are derived from the multiphase lines.

21. A converter as in claim 1, wherein said stator means includes a stator winding galvanically linking the multiphase and single-phase systems.

22. A converter as in claim 21, wherein the leakage in the stator winding is low.

23. A phase converter as in claim 21, wherein the single-phase system includes two single-phase lines, one of said single-phase lines being common with one of the lines of said multiphase system, said voltage source means being connected between one of said terminals and the common one of said lines.

24. A converter as in claim 4, wherein the single-phase system includes two single-phase lines, one of said single-phase lines being common with one of the lines of said multiphase system, said voltage source means being connected between one of said terminals and the common one of said lines.

25. A converter as in claim 22, wherein the single-phase system includes two single-phase lines, one of said single-phase lines being common with one of the lines of said multiphase system, said voltage source means being connected between one of said terminals and the common one of said lines.

26. A converter as in claim 21, wherein said stator means includes a terminal connected to said single-phase line, and wherein the no-load and load voltage difference at a terminal to which the single-phase system is not connected jointly with the multiphase system is determined by comparison with a point at a fixed voltage potential, said voltage source means including means for introducing the no-load and voltage difference as a proportionality factor for establishing the nominal value of the auxiliary voltage.

27. A converter as in claim 1, wherein said voltage source means includes regulating means for rotating the voltage relative to the lines for regulating the transmitted real power.

28. A converter as in claim 27, wherein said regulating means includes a transverse transformer for rotating the voltage.

29. A converter as in claim 27, wherein said stator winding includes taps for rotating the voltage.

30. A converter as in claim 27, wherein said voltage source means includes induction regulators for rotating the voltage.

31. A converter as in claim 15, wherein said regulating means includes a multiphase synchronous machine for supplying an auxiliary voltage.

32. A converter as in claim 1, wherein the lines of the multiphase system carry multiphase current having inverse components, said voltage source means including means for regulating the inverse components.

33. A converter as in claim 32, wherein said voltage source means includes static means for rotating the multiphase voltage.

34. A converter as in claim 1, wherein said voltage source means includes means for varying the transmission ratio of the two systems so as to regulate the reactive power transmitted.

35. A converter as in claim 34, wherein said voltage source means includes a longitudinal transformer for varying the voltages of the system.

36. A converter as in claim 34, wherein said voltage source means includes induction regulators for varying the voltage at the lines.

37. A converter as in claim 34, wherein said voltage source means includes a multiphase synchronous machine for varying the multiphase voltage.

38. A converter as in claim 34, wherein said voltage source means includes a static arrangement for varying the voltage along the lines.

39. A converter as in claim 5, wherein said exciter means is regulated for varying the reactive power in the lines.

40. A converter as in claim 1, wherein the squirrel cage winding is provided with Roebel rods.

41. A converter as in claim 1, wherein the stator winding is constructed to cause the synchronous rotary flows of the multiphase and single-phase systems to compensate for each other.

* * * * *